(12) United States Patent
Tateyama et al.

(10) Patent No.: US 6,338,744 B1
(45) Date of Patent: Jan. 15, 2002

(54) POLISHING SLURRY AND POLISHING METHOD

(75) Inventors: Yoshikuni Tateyama, Hiratsuka; Katsumi Yamamoto, Hachioji; Hiroshi Kato, Tokuyama; Kazuhiko Hayashi, Shinnanyo; Hiroyuki Kono, Shiki, all of (JP)

(73) Assignees: Tokuyama Corporation, Yamaguchi-ken; Toshiba Corporation, Kanagawa-ken, both of (JP)

( * ) Notice: Subject to any disclaimer, the term of this patent is extended or adjusted under 35 U.S.C. 154(b) by 0 days.

(21) Appl. No.: 09/481,573

(22) Filed: Jan. 11, 2000

(30) Foreign Application Priority Data

Jan. 11, 1999 (JP) .............................. 11-3889

(51) Int. Cl.$^7$ ................................................ B24D 3/02
(52) U.S. Cl. ............................. 51/308; 451/38; 451/41
(58) Field of Search ....................... 451/38, 41; 51/308; 134/7, 13, 2

(56) References Cited

U.S. PATENT DOCUMENTS

| | | | |
|---|---|---|---|
| 3,170,273 A | 2/1965 | Walsh et al. ................. 51/281 |
| 4,011,099 A | 3/1977 | Gutsche ........................ 134/7 |
| 4,343,717 A | * 8/1982 | Lok ........................ 252/313.2 |
| 5,028,360 A | * 7/1991 | Ito et al. ....................... 264/12 |
| 5,221,497 A | * 6/1993 | Watanabe et al. ......... 252/313.2 |
| 5,264,010 A | 11/1993 | Brancaleoni et al. .......... 51/308 |
| 5,571,373 A | * 11/1996 | Krishna et al. ........... 156/636.1 |
| 5,582,816 A | 12/1996 | Mandanas et al. ............. 424/49 |
| 5,697,992 A | 12/1997 | Ueda et al. .................... 51/307 |
| 5,904,159 A | 5/1999 | Kato et al. ....................... 134/7 |

FOREIGN PATENT DOCUMENTS

| | | |
|---|---|---|
| EP | 0 549 287 | 6/1993 |
| JP | 4-313224 | 11/1992 |
| JP | 9-142827 | 6/1997 |

* cited by examiner

Primary Examiner—M. Rachuba
(74) Attorney, Agent, or Firm—Wenderoth, Lind & Ponack, L.L.P.

(57) ABSTRACT

Provided is a high purity polishing slurry which provides a material to be polished with a high scratch resistance and has a high polishing efficiency and which less contaminates the material to be polished. The polishing slurry comprises water and silica particles dispersed in water, wherein the above silica particles have an average primary particle size of 50 to 300 nm and a refractive index of 1.41 to 1.44 and are synthesized in a liquid phase and produced without passing through a drying step; and the K value is $5\times10^{-6}$ mol/m$^2$ or more. Further, a polishing process for a semiconductor wafer using the above polishing slurry is provided.

9 Claims, 3 Drawing Sheets

POLISHING SLURRY AND POLISHING METHOD

FIELD OF THE INVENTION

The present invention relates to a polishing slurry and a polishing method using the same. More specifically, the present invention provides a novel polishing slurry used for chemically and mechanically polishing a silicon dioxide film or metal film formed on a semiconductor substrate such as a silicon wafer, and a polishing method using the same.

BACKGROUND OF THE INVENTION

As semiconductor devices are highly integrated, wiring techniques advance more and more toward fineness and multilayer. Advance toward fineness and multilayer in wiring increases a difference in a level between layers and steepens a gradient of wirings toward a substrate, so that a processing accuracy and a reliability of the wirings formed thereon tend to be lowered.

Chemical and mechanical polishing (hereinafter abbreviated as CMP) is paid attentions for solving the problems described above. A CMP method is a means for polishing an interlayer dielectric film such as a silicon dioxide film and a metal film of aluminum, tungsten or the like which forms a wiring layer to thereby planarize them in a production process of semiconductor devices. Less contamination of a material to be polished, smaller scratches, a higher polishing efficiency and a higher selectivity of polishing a silicon dioxide film are required to polishing slurrys used in CMP.

The preceding performances of the polishing slurrys depend largely on abrasive grain components such as silica and cerium oxide which are principal raw materials. For example, a polishing slurry using fumed silica for abrasive grains which has so far been often used has had the problem that while having an excellent purity, it produces a lot of scratches. It is known that when cerium oxide is used for abrasive grains, the polishing efficiency is high, but there has been the problem of the scratch and the purity.

For example, if scratches are produced in a CMP process, wirings of the device are broken or cause short circuit, and therefore it causes a sharp reduction in a yield of the device. When polishing slurrys having a poor purity are used, washing after polishing requires much time, and when washing is insufficient, it causes a reduction in a yield of the device.

SUMMARY OF THE INVENTION

Then, an object of the present invention is to provide a polishing slurry which produces less scratches and can prevent breaking and short circuit in wirings of the device and which can suitably be used for CMP.

Further, another object of the present invention is to provide a high purity polishing slurry which has a high polishing efficiency and less contaminates a material to be polished.

Still another object of the present invention is to provide a polishing slurry capable of being used at a neutral and acidic areas where polishing slurrys have not so far been able to be used.

The objects of the present invention described above can be achieved by a polishing slurry characterized by dispersing silica particles having an average primary particle size of 50 to 300 nm (nanometer) and a refractive index of 1.41 to 1.44 in water.

Figure 1:
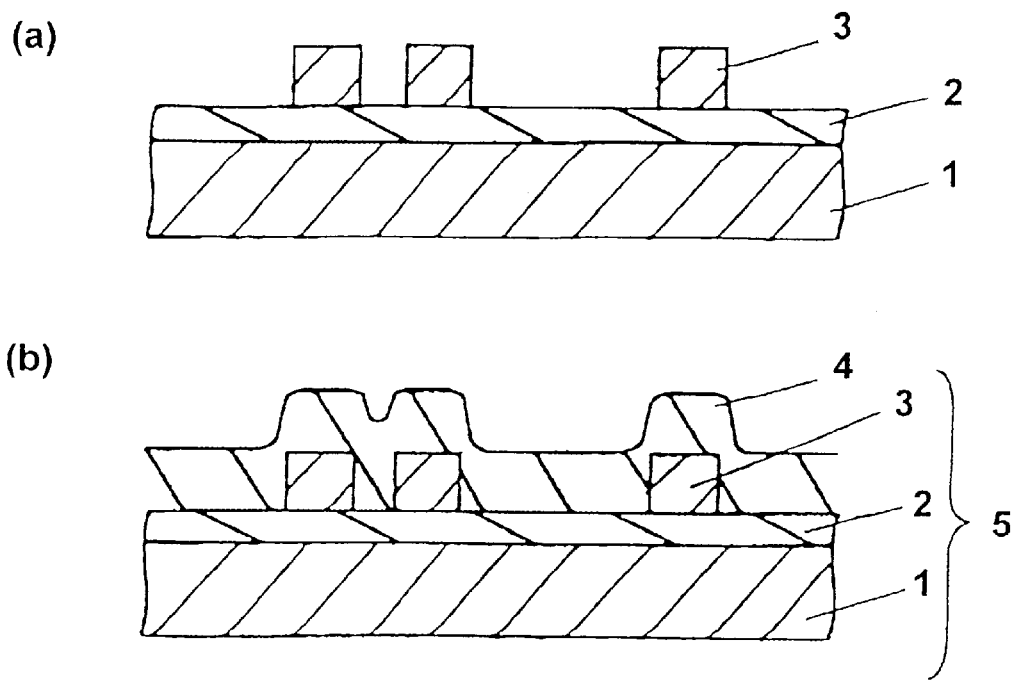
FIG. 1 is a drawing showing a cross-sectional form of a substrate to be polished which was used in the examples.

1 Silicon substrate
2 Silicon dioxide films
3 Al wiring
5 Sample
6 Polishing platen
7 Polishing pad
8 Vacuum chuck holder

DETAILED DESCRIPTION OF THE PREFERRED EMBODIMENTS

The silica particles used in the present invention have to have an average primary particle size (hereinafter referred to simply article size) of 50 to 300 nm. If the average primary particle size is smaller than 50 nm, a lot of scratches are produced on the surface of a polished semiconductor substrate, and therefore it is not preferred. On the other hand, if the average primary particle size is larger than 300 nm, the silica particles tend to be liable to settle down, and therefore it is not preferred as well. The average primary particle size of the silica particles falls more preferably in a range of 60 to 150 nm order to reduce the number of scratches and prevent settling of the silica particles to obtain a good polishing slurry. The average primary particle size described above means a converted particle size calculated according to the following equation about the particles calcined at 800° C. for 2 hours:

$$d(nm) = 6 \times 10^3/(D \times S) \qquad \text{(equation 1)}$$

wherein d is an average primary particle size (unit: nm); D is a density (unit: g/cm$^3$) of the particles; and S is a BET specific surface area (unit: m$^2$/g).

In the present invention, the silica particles have to have a refractive index falling in a range of 1.41 to 1.44.

A silica particle which is usually available, so-called quartz glass (fused quartz) has a refractive index of about 1.46 (NaD ray: wavelength 589 nm, 25° C.) according to a literature. Fumed silica which is widely used as abrasive grains for a polishing slurry for CMP has a refractive index of about 1.458 as is the case with the refractive index of the quartz glass described above. Such fumed silica particles are sufficiently heated and fused and therefore are fine powders of minute quartz glass in which an Si—O—Si net work sufficiently grows and which do not have pores in an inside. Accordingly, they are chemically stable and widely used for industrial uses.

On the other hand, silica particles synthesized in a liquid phase are insufficient in a growth of a net work and are considered to have many silanol groups in the inside of the silica particles. Accordingly, the silica particles have much smaller refractive index than that of the quartz glass described above. However, if the silica particles described above are dried or heated at a temperature of several hundred ° C. or higher, the silanol groups are lost, and the refractive index of the silica particles increase and finally reaches about 1.458 which is almost the same as that of the quartz glass.

The present inventors have found that as the burning temperature goes up and as a result thereof, the refractive index of the silica particles increase, a performance, particularly the number of scratches is reduced. This is considered due to that as the refractive index increase, the chemical and physical properties of the silica particles gradually change and the performance of the polishing slurry changes as well.

Accordingly, in the present invention, the silica particles have to have a refractive index of. 1.44 or less. It is difficult to obtain the silica particles having a refractive index of less than 1.41.

The refractive index of the silica particles can be determined by a immersion method. In the present invention, the refractive index of the silica particles can be determined by the following method.

First, the silica particles are preferably washed with an acid for pre-treatment. For example, the following method can be given as a method for washing with an acid. A pH of an aqueous solution containing silica particles is adjusted to 4 or lower using hydrochloric acid and the like of a high purity, and the solution was left standing for several hours to several days, followed by separating the silica particles by means of a centrifugal separator. The process described above is repeated several times to thereby preferably remove impurity ions (for example, $NH_4^+$, $Na^+$, $K^+$ and the like) contained in the inside of the silica particles. That makes it possible to accurately determine the refractive index of the silica particles.

Next, several solutions having different refractive indices are prepared by changing variously the blending proportion of pure water to glycerin, and the fixed amount of the silica particles is mixed with the respective solutions to disperse them. The absorbances (wavelength 589 nm, 25° C.) of the respective solutions are measured, and the refractive index (NaD ray: wavelength 589 nm, 25° C.) of the solution having the lowest absorbance is set as the refractive index of the silica particles. The absorbance can be measured by means of a commercial spectrophotometer. A commercial Abbe's refractometer can be adopted for determining the refractive index.

Typical examples given as the silica particles which can suitably be used in the present invention include silica particles produced by a so-called sol-gel process in which alkoxysilane is hydrolyzed in a liquid phase, so-called precipitated silica particles produced by neutralizing with a mineral acid using sodium silicate as a main raw material, and colloidal silica particles produced by an Ostwald ripening in which sodium silicate is used likewise as a raw material. These silica particles have to be used without drying after produced in a liquid phase. If these silica particles are dried or calcined, the silica particles increase in a hardness or hard coagulated particles are produced to cause scratches in polishing. Accordingly, it is not preferred.

Among the silica particles produced by the production processes described above, the silica particles using sodium silicate as a raw material contain a lot of impurities such as Na and therefore are not suited to CMP for semiconductor devices as they are. Accordingly, it is desirable to sufficiently remove impurity ions by washing with an acid in order to use them for the polishing slurry of the present invention.

When a K value determined by the following method is $5 \times 10^{-6}$ mol/m$^2$ or more, the polishing slurry of the present invention is reduced in scratches and therefor more preferred. The K value is determined by the following method:

(1) a silica slurry (the silica concentration falls in a range of 15 to 25% by weight) is adjusted to a pH falling in a range of 4±0.1 using HCl or KOH (the range described above has to be maintained for 24 hours or longer);

(2) the silica slurry described above is adjusted to a pH falling in a range of 10.0±0.1 using KOH, and the titration amount of KOH used is determined, which is converted to a value per g of the silica particles, provided that it has to be confirmed that the pH value described above is stable for 3 days or longer; and (3) silica contained in the silica slurry is calcined at 800° C. for 2 hours, and the BET specific surface area thereof is measured, wherein the K value is obtained by dividing the KOH titration amount described above by the BET specific surface area.

The KOH titration amount described above means a concentration per unit surface area of the silanol groups contained in the silica particles. Accordingly, in fumed silica containing few silanol groups in the inside of the particles, the KOH titration amount is almost proportional to the specific surface area of the silica particles, and the K value shows an almost fixed value. On the other hand, the silica particles used in the present invention have a lot of silanol groups as well in the inside of the silica particles, and therefore the K value tend to show a relatively large value. In this method, the silanol groups contained in the inside of the silica particles are determined as well, and therefore the pH has to be stabilized in a range of 10.0±0.1 for 3 days or longer in order to obtain the accurate measured value. If the pH deviates from the range described above within 3 days and is lowered, KOH is further dropwise added to adjust the pH to 10.0±0.1, and it has to be confirmed that the pH is stabilized for further 3 days or longer.

The polishing slurry of the present invention has the large K value described above, for example, preferably $5 \times 10^{-6}$ mol/m$^2$ or more. This is because it is considered that the larger the K value is, the more silanol groups are contained in the inside of the silica particles. It is anticipated that such silica particles have a lower hardness of the particles, and therefore scratches after polishing are considered to be decreased.

The polishing slurry of the present invention has a roughly spherical form of the silica particles. The silica particles having a roughly spherical form are more excellent than those having an angular form in terms of a scratch resistance.

If the concentration of the silica particles contained in the polishing slurry of the present invention is too low, the polishing efficiency is reduced, and if it is too high, the polishing slurry tends to have a too high viscosity or tends to become instable. Accordingly, the content of the silica particles contained in the polishing slurry falls preferably in a range of 1 to 50% by weight. In general, the polishing efficiency depends on the concentration of the silica particles, and therefore they may be used in a high concentration when the polishing efficiency has to be elevated and in a low concentration when polishing has to be lowered. The most preferred content of the silica particles in using them for the polishing slurry is 2 to 20% by weight.

If the content of impurities, particularly a Na element contained in the polishing slurry is high, a device which is a material to be polished is reduced in a yield in a certain case, and therefore the polishing slurry of the present invention has an Na element content of 1 ppm or less, preferably 0.1 ppm or less. A purity of a polishing slurry, particularly the content of an Na element depends on a purity of abrasive grains (silica particles) in many cases. Colloidal silica particles produced by a so-called sol-gel process in which alkoxysilane is hydrolyzed are typical of silica particles satisfying the requirement described above. The colloidal silica particles described above are relatively easily reduced in an Na element content to 1 ppm or less, preferably 0.1 ppm or less.

The polishing slurry of the present invention can be used at any of an acidic area (pH 1 to 5), a neutral area (pH 5 to 9) and an alkaline area (pH 9 to 11) and can properly be used according to uses.

The preferred embodiments at the three areas described above shall be explained below.

It is said that usually, silica particles are instable (liable to be coagulated) at an acidic area, but the polishing slurry of the present invention has such stability as capable of sufficiently standing a practical use even at an acidic area. In general, when polishing a metal layer (for example, tungsten, aluminum, copper and the like), it is polished usually at an acidic or neutral area in many cases, but silica particles have been instable at an acidic area or neutral area and therefore difficult to use. The polishing slurry of the present invention has the characteristic that it can polish an oxide film ($SiO_2$ film) even at an acidic or neutral area unlike fumed silica which has so far been used. That provides the polishing slurry of the present invention with the characteristic that the oxide film layer can be polished as well at the same time as the metal layer described above, which is not observed in conventional polishing slurrys. In polishing devices, there is not only a case where a single metal layer or oxide film layer is polished but also a case where a metal layer and an oxide film layer are present mixedly on the same surface and both have to be polished at the same time. In such case, the polishing slurry of the present invention is very effective.

It is known that polishing slurrys using silica particles for abrasive grains can scarcely polish an oxide film and a metal film usually at a neutral area. The polishing slurry of the present invention has the characteristic that it can polish as well an oxide film to some extent at a neutral area. On the other hand, a metal film of tungsten or the like is scarcely polished, so that polishing having a high selectivity can be carried out. That is, the use of the polishing slurry of the present invention makes it possible to polish only an oxide film without damaging a metal layer. Further, it can effectively be used for polishing a high melting point metal film of TiN and TaN and the like which are used as barrier metal indispensable for producing a device.

Usually, polishing slurrys using fumed silica for abrasive grains are used at a neutral area, and the polishing slurry of the present invention can be used as well. The polishing slurry of the present invention has the characteristic that it produces fewer scratches as compared with those of polishing slurrys of a fumed silica base.

Water soluble salts of 10 to 5000 ppm can be added to the polishing slurry of the present invention when it is used at the acidic, neutral and alkaline areas explained above, and to list up usable salts, they include cations such as $K^+$, $Mg^{2+}$, $Ca^{2+}$, $NH_4^+$, $(CH_3)_4N^+$ and $(CH_3CH_2)_4N^{30}$ and anions such as $Cl^-$, $SO_4^{2-}$, $NO^{3-}$, $Br^-$, $CO_3^{2-}$ and $CH_3COO^-$. The particularly typical salts include KCl, $NH_4Cl$ and $(CH_3)_4NCl$. It is no matter to add no water soluble salts, but if the polishing efficiency, particularly the polishing efficiency to an oxide film has to be elevated, addition of the salts enhances the performance in many cases. In particular, it is very effective for a polishing slurry at neutral area. Further, if the salts are added in the range described above at an acidic area and a neutral area, the stability of the slurry is increased in many cases, and therefore it is suitable. However, if the salts are added in an amount of more than 5000 ppm, the slurry is rather liable to be coagulated in a certain case.

In polishing slurrys of a neutral area, fungi and bacterium grow in storage over a long period of time in a certain case. In such case, antibacterial agents may be added to the polishing slurry of the present invention. The antibacterial agents shall not specifically be restricted, and commercial ones which do not reduce the performance of the polishing slurry can be added. The addition amount shall not specifically be restricted and can be selected usually from a range of 1 to 1000 ppm.

The polishing slurry of the present invention can be used for polishing a material to be polished which is formed on a semiconductor wafer, to be specific, an oxide film and a metal film and the like. Fine polishing causing less scratches can be carried out by using the polishing slurry of the present invention.

As can be understood from the above explanations, in the polishing slurry of the present invention, the silica particles used as abrasive grains have an average primary particle size and refractive index which fall in the specific ranges, and therefore polishing causing less damage to a material to be polished can be carried out. Further, the polishing slurry of the present invention has the characteristic that it can polish a silicon dioxide film as well at an acidic area. It can polish a silicon dioxide film and barrier metals at a neutral area, and polishing causing less scratches can be carried out as well at an alkaline area.

The present invention shall specifically be explained below with reference to examples, but the present invention shall by no means be restricted by these examples.

EXAMPLE AND COMPARATIVE EXAMPLES

Synthetic example of silica particles:

A reactor having a content volume of about 4 liters which is provided with a jacket was charged with 1800 g of methanol and 200 g of ammonia solution (ammonia content is 25% by weight) respectively and stirred well to prepare a reaction solution. Next, dropwise added separately into the reaction solution at the same time were methyl silicate [$Si(OCH_3)_4$] at a rate of 2.5 g/min and ammonia solution (12% by weight) at a rate of 1.4 g/min respectively while maintaining the reaction solution at a temperature of 20° C. and stirring at a revolution of 180 rpm. The reaction solution started becoming cloudy little by little about 10 minutes after starting drop-wise adding methyl silicate, and it was confirmed that silica particles were produced. Dropping was finished 8 hours after starting drop-wise adding. The whole dropping amounts were 1200 g for methyl silicate and 660 g for ammonia solution. After continuing stirring for further one hour, the suspension in the system was taken out. The resulting suspension was a homogeneous milky white slurry having a weight of about 3800 g and contained about 460 g of the silica particles.

Methanol which was the solvent and ammonia were removed from the silica slurry synthesized above by means of an evaporator. Distillation was further continued while adding pure water, and the slurry was heated for 2 hours or longer at a temperature of 90° C. or higher at which the slurry boiled to adjust the silica concentration to 10% by weight (silica A). The silica slurry described above had a pH of 7.3. The silica particles thus synthesized were observed by means of an SEM to find that the spherical silica particles with a high monodispersity having an average primary particle size of 100 nm were obtained.

It can be found that the silica particles synthesized by the operation described above were synthesized in a liquid phase and produced without passing through a drying step.

Further, silica particles which were synthesized in the same manner as described above were calcined at 1000° C. for 2 hours in an electric furnace after drying. The silica obtained after calcining was dispersed in water so that the silica concentration became 10% by weight to obtain a stable silica slurry (silica B) by dispersing the silica by means of a mixer having a high shearing capacity.

Further, several kinds of silicas having different average primary particle size were synthesized in the same manner as described above, except that the composition of the reaction solution was changed, and they were used for the following experiments.

Measurement of refractive index:

The refractive index of the silica particles was measured by a immersion method.

First, for the sake of pretreatment, high purity hydrochloric acid was used to adjust an aqueous solution containing the silica particles to a pH of 4 or less, and the solution was left standing for several days, followed by separating the silica particles by means of a centrifugal separator. The process described above was repeated three times to thereby remove impurity ions contained in the inside of the silica particles.

Next, a glycerin concentration was variously changed by 2.5% by weight in a ratio of glycerin to pure water falling in a range of 70 to 95% by weight: 30 to 5% by weight to prepare liquids having different refractive indices, and the silica particles were mixed therewith respectively in a concentration of 5% by weight and dispersed. The respective liquids were measured for an absorbance (wavelength: 589 nm, 25° C.) by means of a spectrophotometer and measured for a refractive index (NaD ray: wavelength 589 nm, 25° C.) by means of an Abbe's refractometer. The absorbances were plotted to the refractive indices thus measured to determine a refractive index value observed when the above absorbance took a minimum value, and the value was set as the refractive index value (hereinafter abbreviated as $n_D^{25}$) of the silica particles.

Measurement of K value:

Silica particles washed with an acid in the same manner as in measuring the refractive index described above were used to prep are a silica slurry having a slurry concentration of 20% by weight. HCl or KOH was used to adjust the silica slurry to a pH falling in a range of 4±0.1, and it was confirmed that the pH stayed in this range for 24 hours or longer. Then, a suitable amount of KOH was added to the silica slurry described above, and the pH (25° C.) was measured after leaving standing for 3 days or longer. The KOH titration amount consumed when the pH was 10.0 was calculated from the relation of the pH with the KOH titration amount which was converted to per g of the silica particles. On the other hand, the silica particles were calcined at 800° C. for 2 hours, and the BET specific surface area thereof was measured. A value obtained by dividing the KOH titration amount described above by the BET specific surface area was set as the K value.

Content of Na element:

The contents of an Na element and other metal elements were determined by an atomic absorption method and an ICP emission method.

Preparation of polishing slurry:

The silica produced in the synthetic example of the silica particles described above was used to prepare a polishing slurry. The silica concentration was 10% by weight, and KOH was added to adjust the pH to 10.5.

Polishing method:

The polishing method of a semiconductor device according to the present invention shall be explained with reference to the drawings.

As shown in FIG. 1(a) and (b), a silicon dioxide film 2 was formed as an dielectric film on a silicon substrate 1, and an Al wiring 3 having a width of about 0.3 μm and a height of about 0.4 μm was formed thereon by a conventional lithography method and an etching method. Spaces between the wirings were five kinds of, for example, 0.3 μm, 3 μm, 30 μm, 300 μm and 3000 μm. Then, a silicon dioxide film 4 having a thickness of about 1.3 μm which was a film to be polished was formed by a plasma CVD method.

Figure 2:
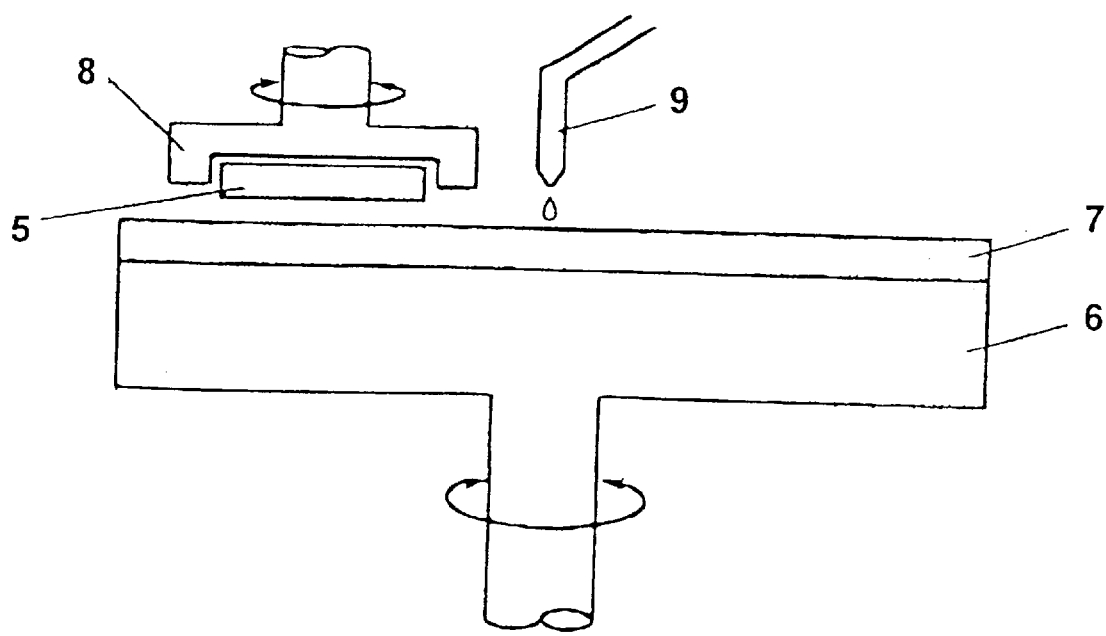
FIG. 2 is a drawing showing a schematic structure of a polishing device used in the examples.

Then, a polishing device shown in FIG. 2 was used to subject this sample 5 to CMP to planarize the dielectric film. This device is composed of a rotatable polishing platen 6, a polishing pad 7 adhered on the polishing platen 6, a rotatable vacuum chuck holder 8 disposed above the polishing platen 6 and a pipe 9 for feeding a polishing slurry which is connected to a polishing slurry tank and in which a discharge part is extended to the vicinity of the polishing pad 7. The sample 5 is vacuum-chucked to the vacuum chuck holder 8 so that the surface to be polished is opposed to the polishing pad 7. The pipe 9 for feeding a polishing slurry is equipped with a means for controlling the feed amount of the polishing slurry. The polishing pad comprising foamed urethane and having a thickness of 1.2 mm was used.

In CMP, several kinds of the polishing slurrys in which the silica particles having varied primary particle size were dispersed respectively in a proportion of 10% by weight were used as the polishing slurry to carry out polishing. The polishing conditions were, for example, a polishing pressure of 300 gf/cm², a revolution of the polishing platen and the vacuum chuck holder of 100 rpm and a polishing slurry feeding amount of 200 ml/min. The polishing pad was regenerated after polishing by means of a nickel plate conditioner. Pressure applied when the sample 5 contacts the polishing pad 7 is designed so that it can optionally be controlled by compressed air.

A measuring device of an image processing system was used for measuring scratches on the polished film on the substrate after polishing.

The physical properties of the silica slurries of the silicas A and B and the polishing results are shown in Table 1 and Table 2.

TABLE 1

| Kind of silica | Silica A | Silica A | Silica A |
|---|---|---|---|
| Specific surface area (m²/g) | 27 | 45 | 90 |
| Primary particle size (nm) | 100 | 60 | 30 |
| $n_D^{25}$ | 1.424 | 1.427 | 1.426 |
| K value (mol/m²) | 2.0 × 10⁻⁵ | 1.1 × 10⁻⁵ | 6.5 × 10⁻⁶ |
| Number of scratches | 10 | 25 | 190 |

TABLE 2

| Kind of silica | Silica B | Silica B | Silica B |
|---|---|---|---|
| Specific surface area (m²/g) | 27 | 45 | 90 |
| Primary particle size (nm) | 100 | 60 | 30 |
| $n_D^{25}$ | 1.457 | 1.455 | 1.457 |
| K value (mol/m²) | 2.0 × 10⁻⁶ | 2.3 × 10⁻⁶ | 2.0 × 10⁻⁶ |
| Number of scratches | 45 | 130 | 850 |

As apparent from the results shown in the tables, while in the silica B which was calcined at 1000° C., the refractive index shows a value of about 1.46 which is almost the same as that of quartz glass, in the silica A which was synthesized in a liquid phase and produced without passing through a drying step, the refractive index shows a low value falling in a range of 1.41 to 1.44. Further, while the silica A has a K value of $5 \times 10^{-6}$ mol/m$^2$ or more, the silica B has a K value of less than $5 \times 10^{-6}$ mol/m$^2$.

Figure 3:
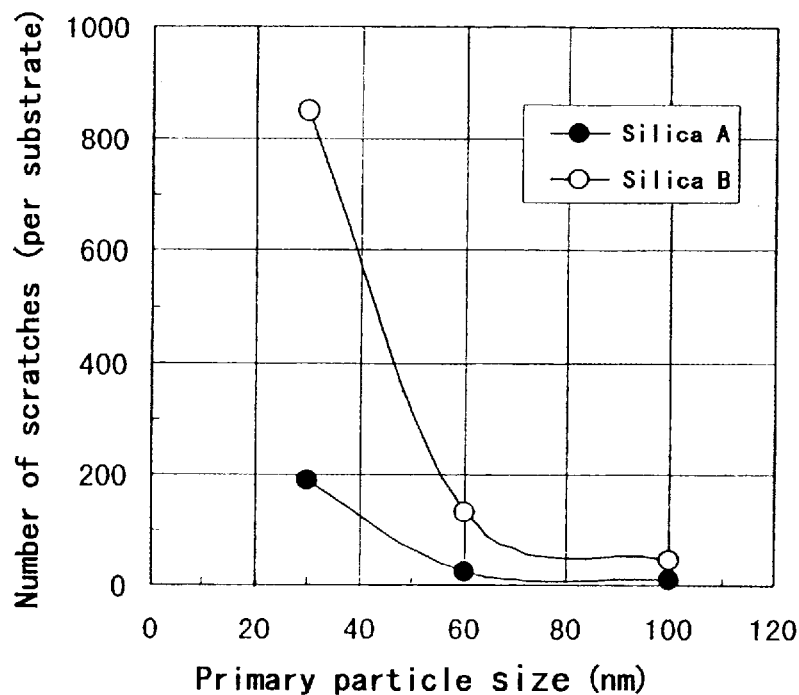
FIG. 3 is a graph showing the relation of the number of scratches produced after polishing with the average primary particle size of the silica particles.

The relation of average primary particle size of the silica particles with the number of the scratches produced after polishing the sample 5 using the polishing method of the present invention is shown in FIG. 3.

As shown in FIG. 3, the larger the average primary particle size of the silica particles grows, the more the number of scratches is reduced, and it is lowered to 25 scratches or less in an average primary particle size of 60 nm or more. That is, controlling of the average primary particle size of the silica particles to 60 to 300 nm makes it possible to stably reduce the number of scratches. Further, it is apparent that in the silica A, that is, in the refractive index of the silica falling in a range of 1.41 to 1.44, the number of scratches is reduced furthermore.

A polishing rate of 1100 Å/min and a uniformity of ±8% on the surface in the polishing rate were obtained. The silica A described above was used to analyze impurities contained in the polishing slurry to find that an Na element which was a typical impurity was 0.1 ppm or less and other metal elements excluding the Na element were below detection limits.

Next, the silica A used above having an average primary particle size of 100 nm was used to prepare acidic, neutral and alkaline polishing slurrys having a silica concentration of 7% by weight. KCl was added as a salt to the respective polishing slurrys, and the pH was adjusted to acidity by adding hydrochloric acid and to alkalinity by adding ammonia. For the sake of comparison, fumed silica (specific surface are: about 90 m$^2$/g) was used to prepare a polishing slurry in the same manner, and it was evaluated for comparison.

Figure 4:
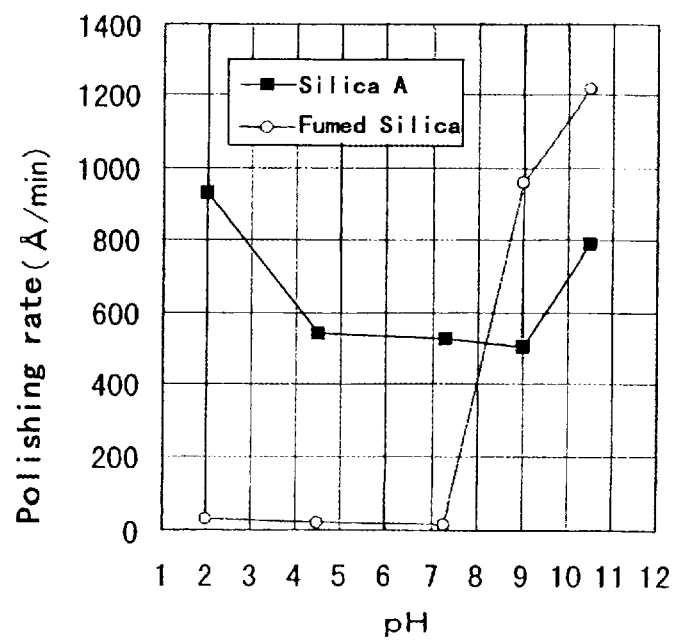
FIG. 4 is a graph showing the relation of the pH of a polishing slurry with the polishing speed.

The results of the polishing rate are shown in FIG. 4. Thus, the polishing slurry using the silica A (refractive index: 1.41 to 1.44) of the present invention has the characteristic that it is a little inferior in a polishing rate at a pH of 9 or higher as compared with the polishing slurry using fumed silica (refractive index: about 1.46) but can polish a silicon dioxide film as well at an acidic or neutral area. Such difference in the polishing performance is considered to depend largely on a difference in the refractive index of the silica particles. Further, scratches produced on the silicon dioxide films after polished with the polishing slurrys described above were compared to find that the silica A was decreased in scratches to a large extent at any pH areas.

Next, the KCl concentration of the polishing slurry using the silica A described above was variously changed to prepare polishing slurrys, and the polishing performances were evaluated.

Figure 5:
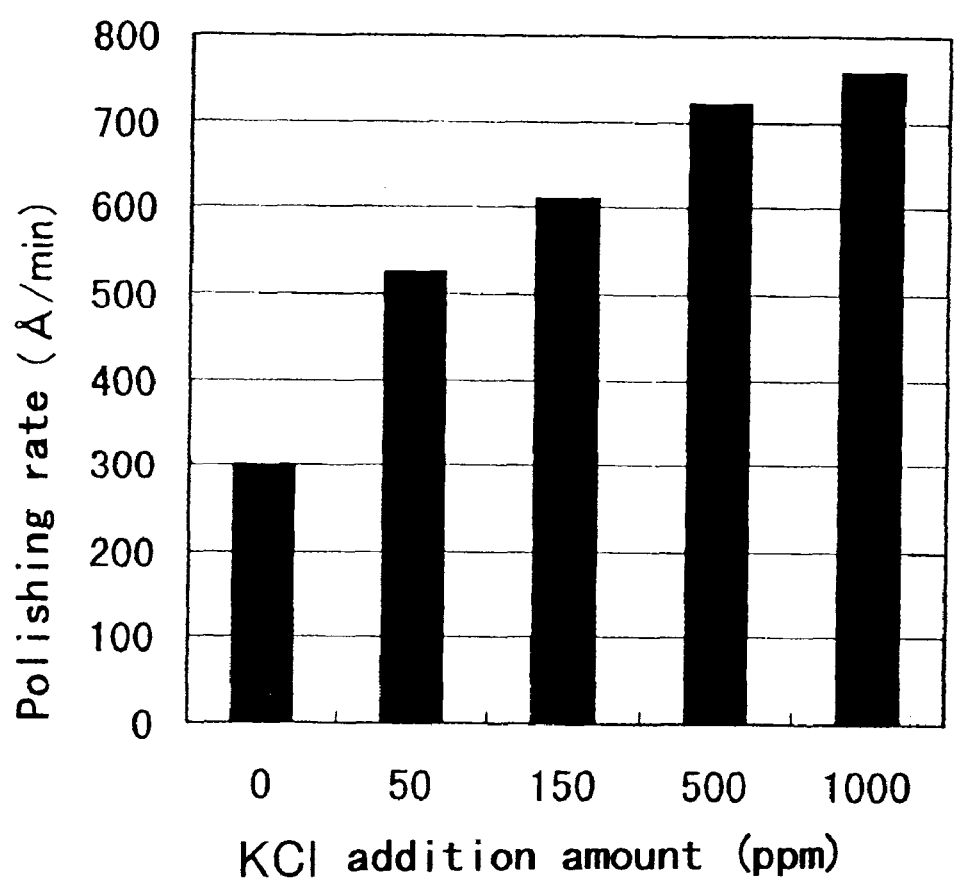
FIG. 5 is a graph showing the relation of the addition amount of KCl to the polishing slurry with the polishing speed.

The results of the polishing rates are shown in FIG. 5. Thus, it can be found that only addition of 50 ppm of KCl can raise the polishing rate by almost twice and the polishing rate can be controlled by variously changing the addition amount of the salt. The polishing slurrys having a salt concentration exceeding 5000 ppm tend to be aggregated.

The present invention shall not be restricted to the embodiments described above. In the embodiments, a silicon dioxide film was used as a film to be polished, but the present invention shall not be restricted to a silicon dioxide film and is effective as well for any materials such as W, Al, Si, Cu, Ru, SiN, TiN, TaN and the like. However, the polishing rate and an uniformity on the surface in the polishing rate are varied according to the kind of the polishing pad.

What is claimed is:

1. A polishing slurry comprising a dispersion of silica particles in water, wherein the silica particles have an average primary particle size of 50 to 300 nm and a refractive index of 1.41 to 1.44.

2. The polishing slurry as described in claim 1, wherein the average primary particle size is 60 to 150 nm.

3. The polishing slurry as described in claim 1, having a K value of $5 \times 10^{-6}$ mol/m$^2$ or more.

4. The polishing slurry as described in claim 1, wherein the silica particles have a nearly spherical form.

5. The polishing slurry as described in claim 1, wherein the silica particles contained in the polishing slurry have a content of 1 to 50% by weight.

6. The polishing slurry as described in claim 1, wherein an Na element has a content of 1 ppm or less.

7. The polishing slurry as described in claim 1, further containing 10 to 5000 ppm of a water soluble salt.

8. The polishing slurry as described in claim 7, wherein the water soluble salt contains a member selected from the group consisting of $K^+$, $Mg^{2+}$, $Ca^{2+}$, $NH^{4+}$, $(CH_3)_4N^+$ and $(CH_3CH_2)_4N^+$ as a cation and a member selected from the group consisting of $Cl^-$, $SO_4^{2-}$, $NO^{3-}$, $Br^{31}$, $CO_3^{2-}$ and $CH_3COO^-$ as an anion.

9. The polishing slurry as described in claim 1, wherein the silica particles are synthesized in a liquid phase and produced without passing through a drying step.

* * * * *